United States Patent
Kellberg

[19]

[11] Patent Number: 6,089,781
[45] Date of Patent: Jul. 18, 2000

[54] STRUCTURE UTILIZING A SHAPE-MEMORY ALLOY FASTENER

[75] Inventor: Christian J. Kellberg, El Segundo, Calif.

[73] Assignee: Hughes Electronics Corporation, El Segundo, Calif.

[21] Appl. No.: 09/132,960

[22] Filed: Aug. 12, 1998

[51] Int. Cl.[7] .................................................. B25G 3/08
[52] U.S. Cl. ......................... 403/381; 403/363; 403/297
[58] Field of Search ................................. 403/381, 363, 403/331, 292, 297, 266, 267, 273

[56] References Cited

U.S. PATENT DOCUMENTS

| | | | |
|---|---|---|---|
| 2,863,185 | 12/1958 | Riedi | 403/381 X |
| 4,297,779 | 11/1981 | Melton et al. | 29/446 |
| 4,410,488 | 10/1983 | Gessinger et al. | . |
| 4,681,476 | 7/1987 | Mischenko | 403/381 X |
| 4,743,079 | 5/1988 | Bloch | . |
| 5,026,441 | 6/1991 | Kim et al. | . |
| 5,406,698 | 4/1995 | Lipinski | 29/727 |
| 5,531,539 | 7/1996 | Crawford | 403/381 |
| 5,536,126 | 7/1996 | Gross | . |

*Primary Examiner*—Terry Lee Melius
*Assistant Examiner*—John R. Cottingham
*Attorney, Agent, or Firm*—T. Gudmestad; M.W. Sales

[57] ABSTRACT

A structure includes an electronic device support, an electronic device, and a fastener for the electronic device support and the electronic device. There is a first dovetail slot in the electronic device support and a second dovetail slot in the electronic device. The first dovetail slot and the second dovetail slot are in a facing relationship. A bar of a shape-memory alloy in the recovered state is received into the first slot and the second slot and has a cross sectional shape with V-shaped grooves on its opposing lateral sides engaging the first dovetail slot and the second dovetail slot.

21 Claims, 4 Drawing Sheets

STRUCTURE UTILIZING A SHAPE-MEMORY ALLOY FASTENER

BACKGROUND OF THE INVENTION

This invention relates to the fastening of structures together, and in particular to a fastener approach useful for fastening an electronic device to a support and heat sink.

An electronic device that produces heat during operation may be cooled to prevent overheating of the electronic device. To achieve the necessary cooling, in one approach the electronic device is supported on and fastened to a heat sink. The heat sink conducts away the heat produced by the electronic device, maintaining the electronic device within an operating temperature range.

To achieve the most efficient heat removal performance, the electronic device should be in good thermal contact with the heat sink. If there is an air gap at the interface between the electronic device and the heat sink, the air gap will serve as an insulator and an impedance to the heat flow. A close contact between the facing surfaces of the heat sink and the electronic device is therefore desirable.

A number of approaches are known for attaching the electronic device to the heat sink so as to achieve good thermal efficiency at the interface. For example, the articles may be joined by mechanical fasteners at their peripheries, but any deviation from planarity in the facing surfaces will lead to thermal inefficiency. The articles may be brazed together with a brazing alloy between the articles. This approach requires that the articles be heated above the melting point of the brazing alloy, which may not be acceptable for some types of electronic devices. The articles may be joined with a thermally conductive adhesive, such as a carbon-filled or metal-filled curable adhesive. The thermal transfer rates through available thermally conductive adhesives are rather poor, reducing the efficiency of the thermal conduction process. With some of these approaches, the electronic device cannot be later separated from the heat sink for rework, repair, or other reasons. Thus, while operable techniques are available, there is opportunity for improvement.

There is a need for a better approach to joining two articles together to achieve both mechanical fastening and good thermal conductivity between the articles. The present invention fulfills this need, and further provides related advantages.

SUMMARY OF THE INVENTION

The present invention provides an approach for fastening two articles together so as to achieve good mechanical contact and good thermal conductivity between the articles. The articles are firmly joined but may be subsequently separated. The technique is readily utilized, and is particularly useful for fastening an electronic device to a heat sink.

In accordance with the invention, a structure comprises a first article, a second article, and a fastener for the first article and the second article. The fastener comprises a first slot in the first article, with a first-slot portion wherein a width of the first slot increases with increasing distance from an opening of the first slot, and a second slot in the second article, with a second-slot portion wherein a width of the second slot increases with increasing distance from an opening of the second slot. The opening of the first slot and the opening of the second slot are in a facing relationship. The attachment further includes a bar of a shape-memory alloy received into the first slot and the second slot. The bar has a cross sectional shape including a first-bar portion corresponding to the first-slot portion, wherein a width of a lateral side of the bar increases with increasing distance from a transverse centerline of the bar, and a second-bar portion corresponding to the second-slot portion, wherein a width of the lateral side of the bar increases with increasing distance from a transverse centerline of the bar. The bar of the shape-memory alloy is in a deformed state for insertion, and in a recovered state to lock the articles together. The bar is preferably made of a copper-based shape-memory alloy in those applications where good thermal conduction through the bar is desired.

In a preferred embodiment, the structure comprises an electronic device support, an electronic device, and a fastener for the electronic device support and the electronic device. The fastener comprises a first dovetail slot in the electronic device support, and a second dovetail slot in the electronic device, with the first dovetail slot and the second dovetail slot being in a facing relationship. A bar of a shape-memory alloy is positioned in the first dovetail slot and the second dovetail slot. The bar has V-shaped grooves on its opposing lateral faces engaging the first dovetail slot and the second dovetail slot.

The structure is assembled by providing the elements. The bar of shape-memory alloy is plastically deformed along its longitudinal axis at a lower temperature below a shape-memory transformation temperature, and then inserted into the facing slots. The bar is heated to a higher temperature above the shape-memory transformation temperature to cause it to deform to the recovered state, thereby longitudinally contracting and laterally expanding. The lateral expansion engages the inclined surfaces of the slots, drawing the articles together. The shape-memory transformation temperature may be above or below room temperature, but is preferably below room temperature and the service temperature of the article. In one preferred application, the bar is made of a copper-based alloy with good thermal conductivity.

The fastener approach of the invention tightly fastens the articles together. Installation is accomplished by a simple one-dimensional sliding movement of the bar of shape-memory alloy material. When it is made of a copper-base shape-memory alloy, the fastener provides a good heat flow path between the articles. The fastener may be removed for rework of the article.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 3 are enlarged views of a preferred form of the fastener, wherein

DETAILED DESCRIPTION OF THE INVENTION

Figure 1:
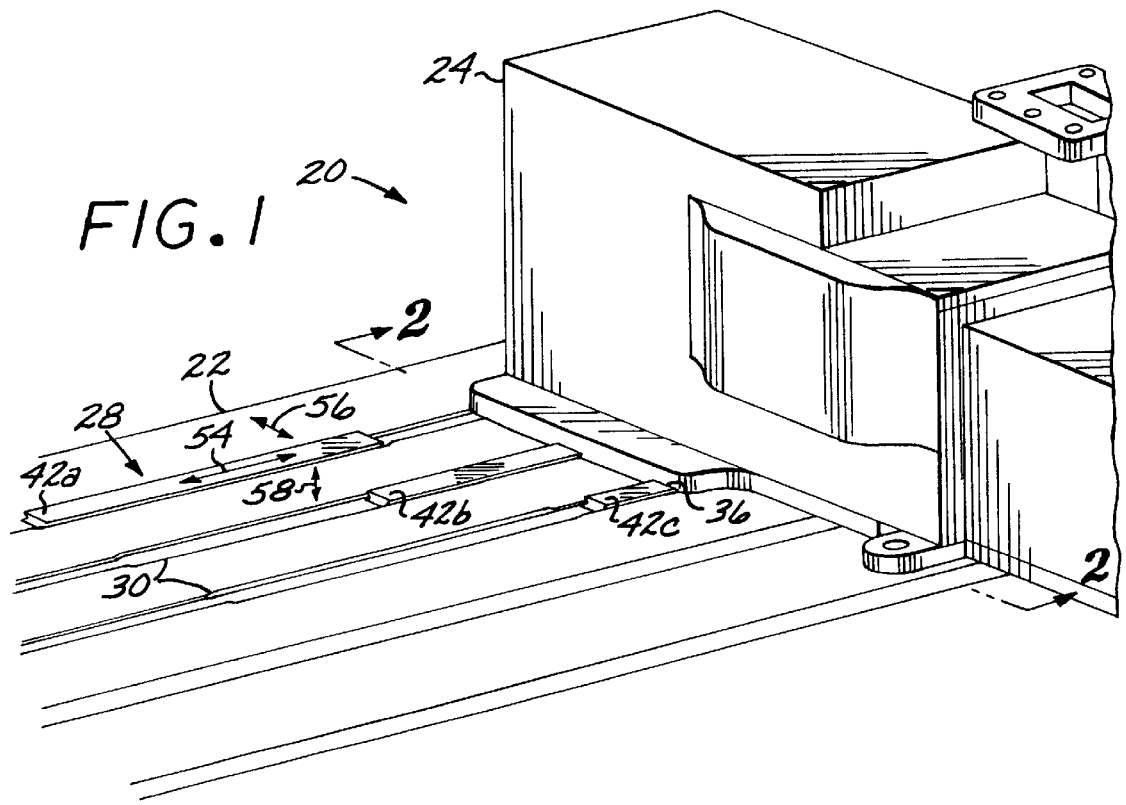
FIG. 1 is a perspective view of an electronic device being fastened to an electronic device support using the approach of the invention.
Figure 2:
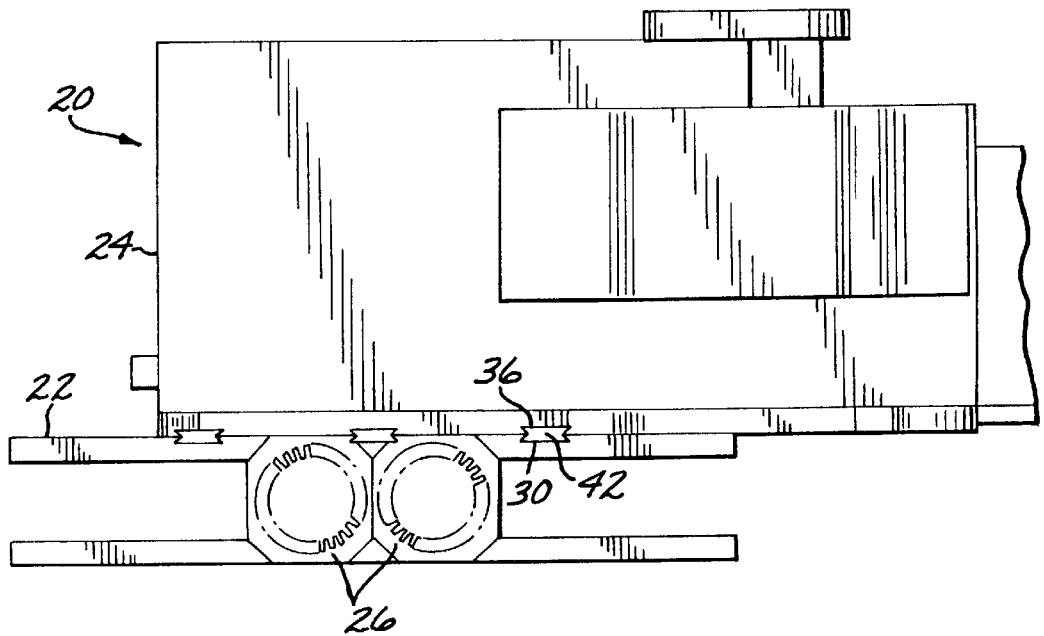
FIG. 2 is an enlarged fragmented sectional view of the electronic device and electronic device support of FIG. 1, taken along lines 2—2.

FIGS. 1 and 2 depict a structure 20 according to the present invention. The structure 20 includes a first article, in the preferred case an electronic device support 22, which also serves as a heat sink, and a second article, in the preferred case an electronic device 24. The electronic device 24 may be any operable electronic device, but is preferably a radio frequency/microwave device. The structures of such electronic device supports 22 and electronic devices 24 are known in the art. As shown in FIG. 2, the electronic device support 22 may include one or more heat pipes 26 to conduct heat away, as well as a metallic body that conducts the heat produced by the electronic device 24 to the heat pipes 26.

The structure 20 further includes a fastener 28 which fastens the electronic device 24 to the electronic device support 22. The fastener is visible in FIGS. 1 and 2, and may be seen in an enlarged form in FIGS. 3A and 3B. The fastener 28 includes a first slot 30 in the electronic device support 22. At least a portion 32 of the first slot 22 has a width $W_1$ which increases with increasing distance from an opening 34 of the first slot 30. The fastener 28 also includes a second slot 36 in the electronic device 22. At least a portion 38 of the second slot 36 has a width $W_2$ which increases with increasing distance from an opening 40 of the second slot 36. The first slot 30 and the second slot 36 are therefore dovetail slots. The opening 34 of the first slot 30 and the opening 40 of the second slot 36 are in a facing relationship.

The fastener 28 further includes a bar 42 made of a shape-memory alloy received into the first slot 30 and the second slot 36. The bar 42 has a cross sectional shape with a first-bar portion 44 corresponding to the first-slot portion 32, wherein a width $W_3$ of a lateral side 46 of the bar 42 increases with increasing distance from a transverse centerline 48 of the bar 42. The bar also has a second-bar portion 50 corresponding to the second-slot portion 38, wherein a width $W_4$ of a lateral side 52 of the bar 42 increases with increasing distance from the transverse centerline 48 of the bar 42. With this geometry, the bar 42 may also be described as having a cross sectional shape with V-shaped grooves on its opposing lateral sides 46 and 52.

The bar 42 is made of a shape-memory alloy. Such alloys are known in the art for use in other applications and are described, for example, in U.S. Pat. Nos. 4,410,488, 5,026, 441, and 5,536,126, whose disclosures are incorporated by reference. The property of interest of such a material in relation to the present invention is its shape change after being deformed longitudinally to a deformed state at a lower temperature below a shape-memory transformation temperature, and then heated to a higher temperature above the shape-memory transformation temperature to change to a recovered state. (The shape-memory transformation temperature is characteristic of the selected shape-memory alloy used in the bar, and is known for each such material.) More specifically, the bar 42 may be deformed by any operable means in a longitudinal direction 54 (FIG. 1), the long direction of the bar 42, at a temperature below the shape-memory transformation temperature. The deforming may be accomplished, for example, by rolling or stretching. This deformation elongates the grains of the shape memory alloy parallel to the longitudinal direction 54 of the bar 42. The deforming operation is substantially at constant volume, so that the bar 42 is reduced in dimension in the width direction 56 and the height direction 58, the two directions which are mutually perpendicular to the longitudinal direction 54.

Upon heating to a temperature above the shape-memory transformation temperature (after insertion into the slots 30, 36), the deformed bar 42 shortens in the longitudinal direction 54 back toward its original, or recovered, length prior to the deforming. The recovery process also occurs substantially at constant volume, so that the bar 42 enlarges in the width direction 56 and the height direction 58, the two directions which are mutually perpendicular to the longitudinal direction 54. For example, if the original deforming was about 7 percent in the longitudinal direction 54, the reduction of the width direction 56 and the height direction 58 during the deforming process is about 3.4 percent in each case. The comparable enlargement of the width direction 56 and the height direction 58 during the recovery process is also about 3.4 percent in each case.

The change in dimension in the width direction 56 and the height direction 58 upon recovery of the shape-memory alloy of the bar 42 is used to advantage to fasten the electronic device 24 securely and tightly to the electronic device support 22. FIG. 1 illustrates three bars 42a–42c that have been deformed and are in the deformed state prior to the commencement of the fastening process. The bar 42a has been placed into the first slot 30 at a location remote from the second slot 36. The first slot 30 is slightly enlarged in the width direction 56 at this location to allow the bar 42 to be placed into the first slot 30. The bar 42b has been slid along the first slot 30 so that it partially engages the second slot 36, and the bar 42c has been slid even further along the first slot 30 and the second slot 36.

Figure 3A:
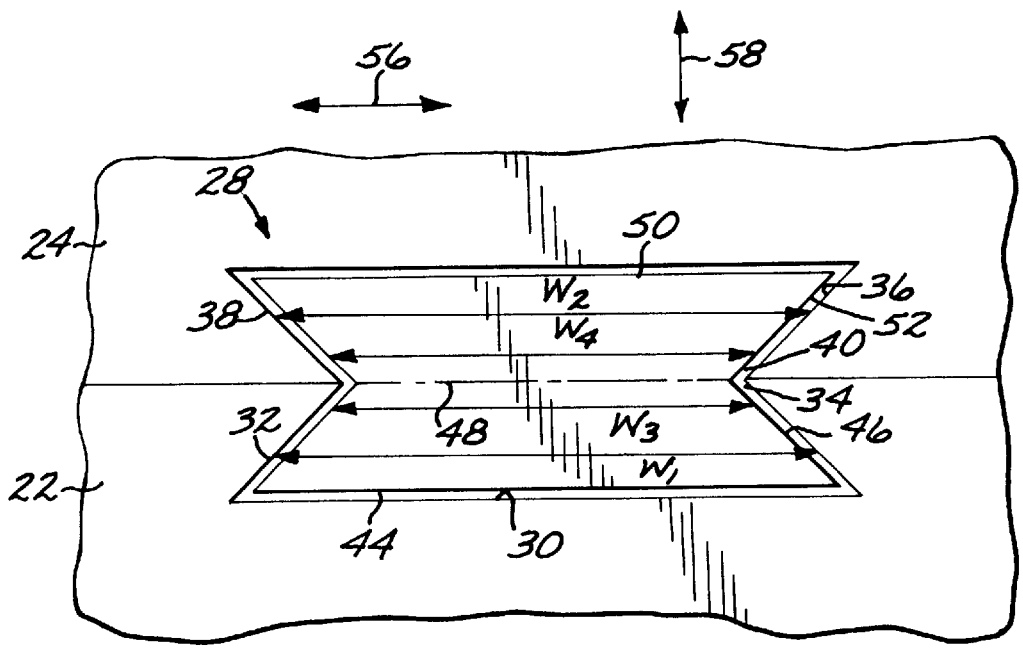
FIG. 3A depicts the fastener with the bar of the shape-memory alloy in the deformed state.

FIG. 3A illustrates the bar 42 in place within the slots 30 and 36, with the bar 42 in the deformed state below the shape-memory transformation temperature. The respective widths $W_1$ and $W_2$ of the slots 30 and 36 are dimensioned so as to be slightly larger than the respective widths $W_3$ and $W_4$ of the bar 42 in the deformed state, so that the bar 42 may easily slide into the slots 30 and 36. The dimensional differences are exaggerated in FIG. 3A for clarity of illustration. The preferred dimensional difference of the widths is about 3.4 percent, corresponding to a deforming of 7 percent, which allows easy sliding and insertion of the bar 42 into the slots 30 and 36.

When the bar 42 is heated sufficiently to cause the bar to transform to the recovered state, with the associated increase in $W_3$ and $W_4$ (about 3.4 percent in the preferred case), the lateral sides 46 of the first bar portion 44 frictionally engage the portion 32 of the first slot 30, and the lateral sides 52 of the second bar portion 50 frictionally engage the portion 38 of the second slot 36. These engagements are on an inclined plane that serves to produce a tight locking. The electronic device 24 is thereby locked to the electronic device support 22. The electronic device 24 is also precisely positioned in relation to the electronic device support 22, and in particular in relation to the heat pipes 26, where provided, and any electrical and microwave external connections that may be required.

Additionally, a top 60 and bottom 62 of the bar 42 frictionally engage a respective top 64 of the second slot 36 and bottom 66 of the first slot 30, ensuring that the locking is tight and without play. This engagement also promotes a close contact and consequent good thermal conductivity path from the electronic device 24, through the bar 42, and into the electronic device support 22 and its heat pipes 26, where provided.

The bar 42 may be made of any operable shape-memory alloy material, such as, for example, conventional Ti—Ni (nitinol) alloys. Preferably for use with fastening electronic devices, the bar 42 is made of a copper-base shape-memory alloy, having at least 50 weight percent copper. The thermal conductivity of such a copper-base shape-memory alloy is relatively good, improving the heat flow from the electronic device 24, through the bar 42, and into the electronic device support 22. Examples of such copper-based shape-memory alloy include Cu—13 percent Al—3 percent Ni, Cu—11 percent Al—4 percent Ni, and Cu—10–15 percent Al—0.5–5.0 percent Ni—0.01–1.0 percent Si—0.01–1.5 percent Zr. A further consideration in selecting the shape-memory alloy is the convenience of the shape-memory transformation temperature, a characteristic property of each shape-memory alloy. Desirably, the shape-memory transformation temperature is below the service operating temperature of the structure and also below ambient temperature. For that case, the bar 42 is cooled to below the shape-memory transformation temperature and deformed, and inserted into the slots 30, 36 which still cold. The structure is thereafter allowed to warm to above the shape-memory transformation temperature, locking the articles together.

Figure 3B:
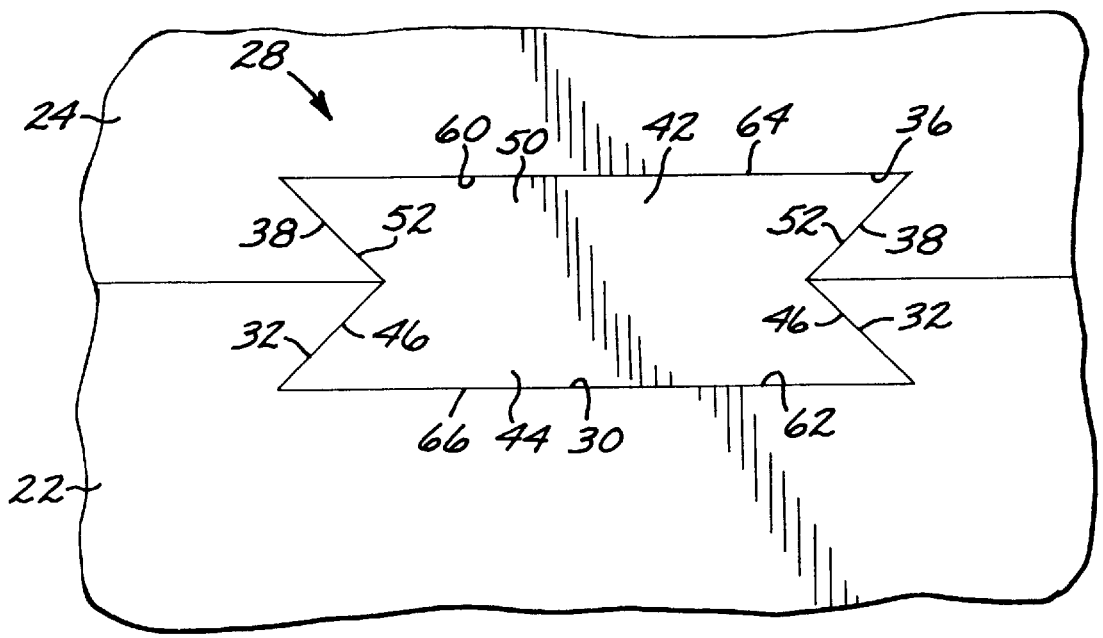
FIG. 3B depicts the fastener with the bar of the shape-memory alloy in the recovered state.
Figure 4:
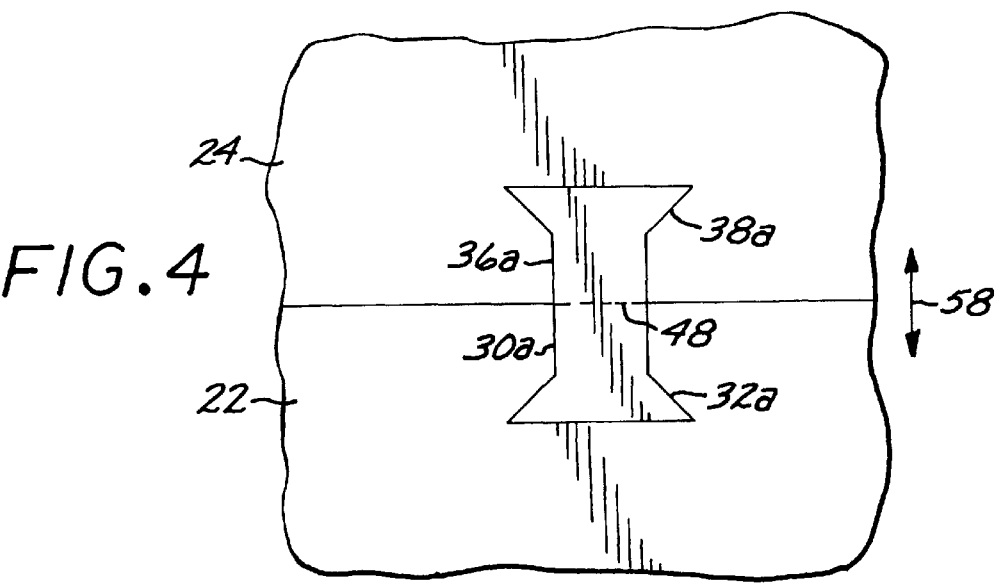
FIG. 4 depicts a second embodiment of a slot for the fastener.

FIGS. 3A and 3B depict one form of the dovetail slots 30 and 36. Other forms are also operable. In the form shown in FIG. 4, the dovetail slots 30a and 36a have the portions 32a and 38a spaced apart in the height direction 58 from the transverse centerline 48, defining keyhole dovetail slots.

Figure 5:
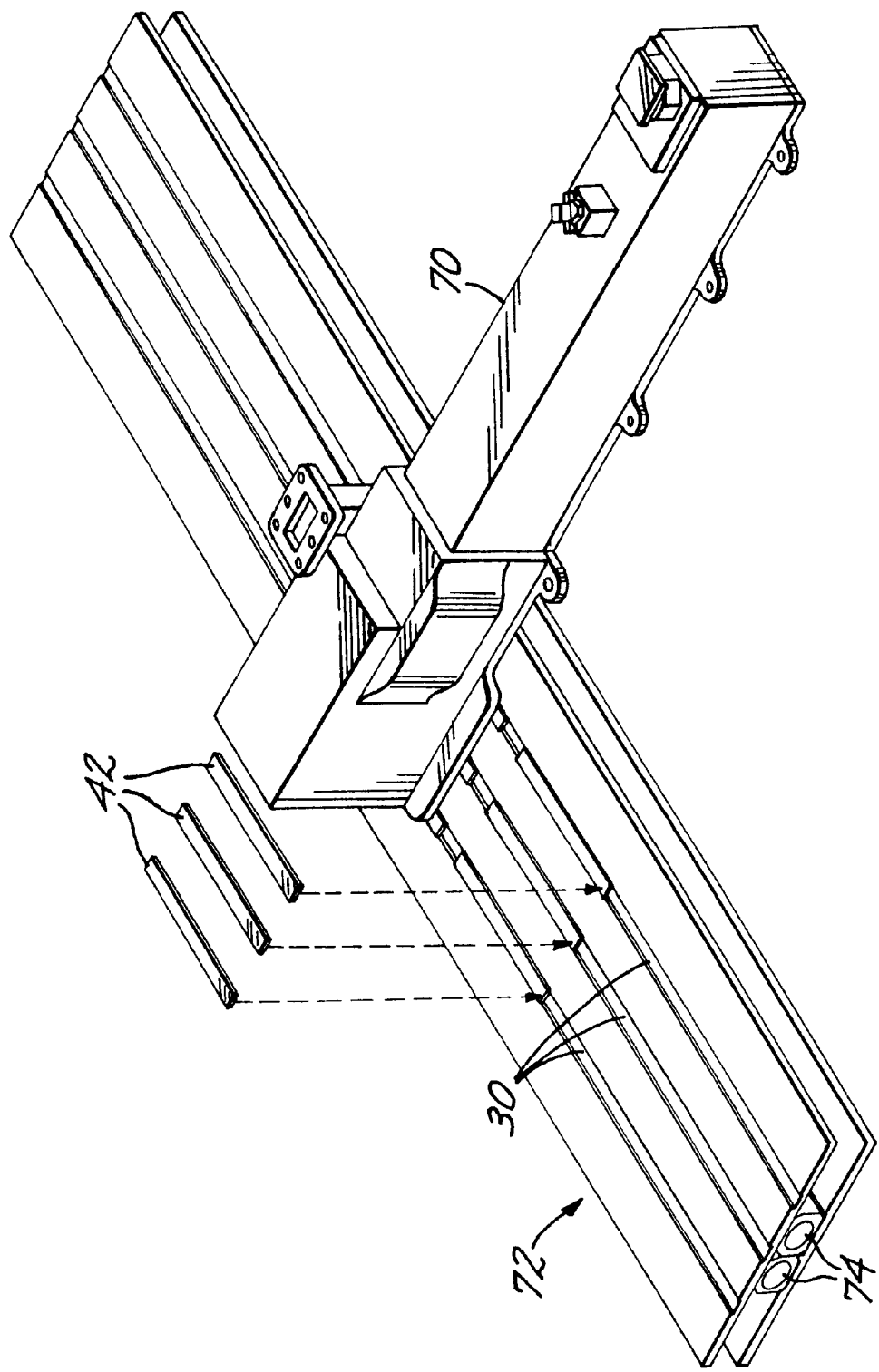
FIG. 5 is a perspective view of the electronic device assembled to a heat sink structure using the approach of the invention.

FIG. 5 depicts the fastening of a traveling wave tube 70, which serves as the electronic device, to a radiator 72, which serves as the electronic device support, the preferred application of the inventor. The radiator 72 has a dual bore heat pipe 74 with fins 76 extending therefrom. Three bars 42 are inserted into their respective slots (slot 30 being visible) and slid into place with the structure at a lower temperature, and then the temperature is increased as described previously to complete the fastening.

Figure 6:
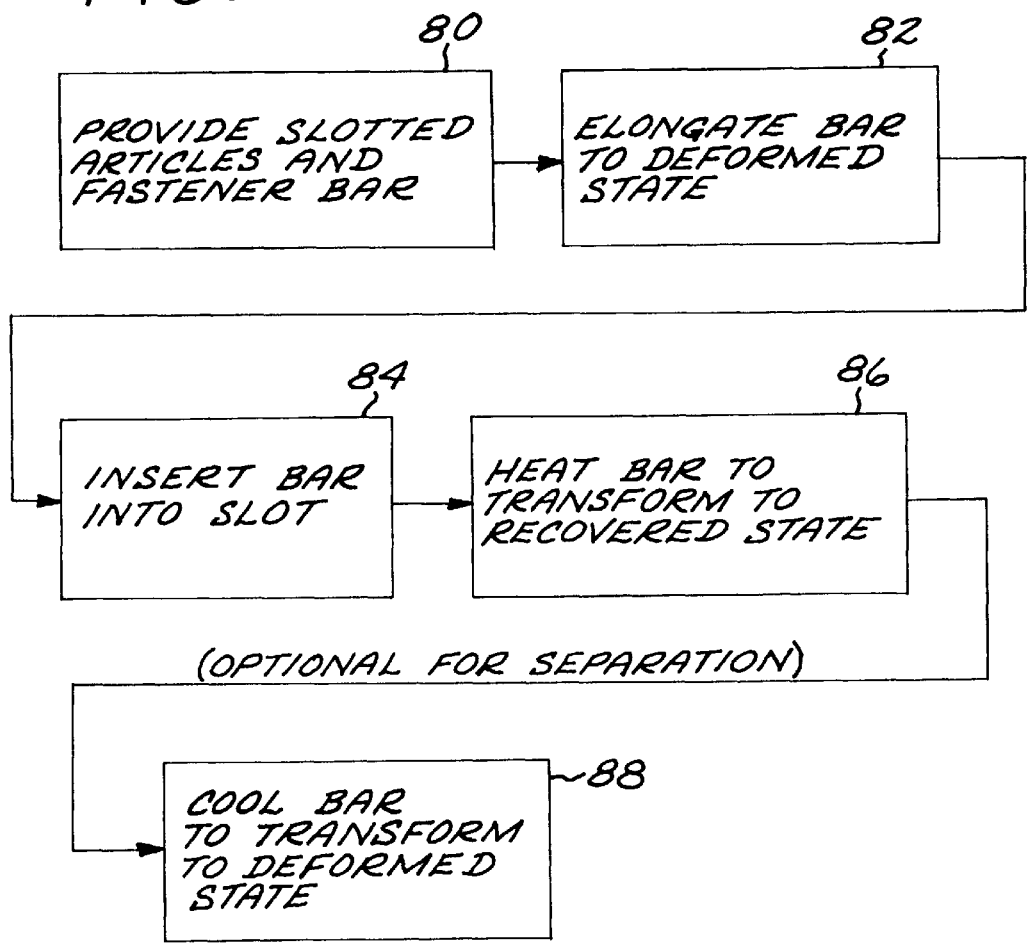
FIG. 6 is a block diagram of a preferred approach to practicing the approach of the invention.

FIG. 6 illustrates the approach of the invention. The articles 22 and 24 with the respective slots 30 and 36, and the bar 42 are provided, numeral 80. The bar 42 is elongated to the deformed state at a temperature below the shape-memory transformation temperature of the shape-memory alloy, numeral 82, prior to being inserted into the slots 30 and 36. The bar 42 is thereafter inserted into the slots 30 and 36, numeral 84, generally in the manner illustrated in FIGS. 1 and 3A. The bar 42, in position within the slots 30 and 36, is thereafter heated (warmed) to a temperature above its shape-memory transformation temperature to cause it to transform to the recovered state, numeral 86, thereby semi-permanently fastening the articles 22 and 24 together with a good thermal conduction path through the bar, in the manner described previously. At a later time, if desired, the bar may be cooled back to a temperature below the shape-memory transformation temperature so that it may be removed, permitting the articles 22 and 24 to be separated, numeral 88.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:
1. A structure, comprising:
 a first article;
 a second article; and
 a fastener for the first article and the second article, the fastener comprising
  a first slot in the first article, the first slot having at least a first-slot portion thereof wherein a width of the first slot increases with increasing distance from an opening of the first slot,
  a second slot in the second article, the second slot having at least a second-slot portion thereof, wherein a width of the second slot increases with increasing distance from an opening of the second slot, the opening of the first slot and the opening of the second slot being in a facing relationship, and
  a bar of a shape-memory alloy received into the first slot and the second slot, the bar having a cross sectional shape including
   a first-bar portion corresponding to the first-slot portion, wherein a width of a lateral side of the bar increases with increasing distance from a transverse centerline of the bar, and
   a second-bar portion corresponding to the second-slot portion, wherein a width of a lateral side of the bar increases with increasing distance from the transverse centerline of the bar.
2. The structure of claim 1, wherein the bar of shape memory alloy is in a deformed state.
3. The structure of claim 1, wherein the bar of shape-memory alloy is in a recovered state.
4. The structure of claim 1, wherein the bar of shape-memory alloy is made of a copper-base alloy.
5. The structure of claim 1, wherein the first slot and the second slot are dovetail slots, and wherein the bar of shape-memory alloy has V-shaped grooves on its opposing lateral sides.
6. A structure, comprising:
 an electronic device support;
 an electronic device; and
 a fastener for the electronic device support and the electronic device, the fastener comprising
  a first dovetail slot in the electronic device support,
  a second dovetail slot in the electronic device, the first dovetail slot and the second dovetail slot being in a facing relationship, and
  a bar of a shape-memory alloy in the recovered state, the bar being received into the first dovetail slot and the second dovetail slot and having a cross sectional shape with V-shaped grooves on its opposing lateral sides engaging the first dovetail slot and the second dovetail slot.
7. The structure of claim 6, wherein the bar of shape-memory alloy is made of a copper-base alloy.
8. The structure of claim 6, wherein the electronic device support comprises a heat sink.
9. A structure, comprising:
 a first article, wherein the first article is an electronic device support;
 a second article, wherein the second article is an electronic device; and
 a fastener for the first article and the second article, the fastener comprising
  a first slot in the first article, the first slot having at least a first-slot portion thereof wherein a width of the first slot increases with increasing distance from an opening of the first slot, a second slot in the second article, the second slot having at least a second-slot portion thereof wherein a width of the second slot increases with increasing distance from an opening of the second slot, the opening of the first slot and the opening of the second slot being in a facing relationship, and a bar of a shape-memory alloy received into the first slot and the second slot, the bar having a cross sectional shape including a first-bar portion corresponding to the first-slot portion, wherein a width of a lateral side of the bar increases with increasing distance from a transverse centerline of the bar, and a second-bar portion corresponding to the second-slot portion, wherein a width of a lateral side of the bar increases with increasing distance from the transverse centerline of the bar.

10. The structure of claim 9 wherein the bar of shape memory alloy is in a deformed state.

11. The structure of claim 9 wherein the bar of shape-memory alloy is in a recovered state.

12. The structure of claim 9 wherein the bar of shape-memory alloy is made of a copper-base alloy.

13. The structure of claim 9 wherein the first slot and the second slot are dovetail slots, and wherein the bar of shape-memory alloy has V-shaped grooves on its opposing lateral sides.

14. A structure of claim 9, wherein the electronic device support is a radiator, and the electronic device is a traveling wave tube.

15. A structure, comprising:

a first article, wherein the first article is a heat sink;

a second article, wherein the second article is an electronic device; and a fastener for the first article and the second article, the fastener comprising a first slot in the first article, the first slot having at least a first-slot portion thereof wherein a width of the first slot increases with increasing distance from an opening of the first slot, a second slot in the second article, the second slot having at least a second-slot portion thereof wherein a width of the second slot increases with increasing distance from an opening of the second slot, the opening of the first slot and the opening of the second slot being in a facing relationship, and a bar of a shape-memory alloy received into the first slot and the second slot, the bar having a cross sectional shape including a first-bar portion corresponding to the first-slot portion, wherein a width of a lateral side of the bar increases with increasing distance from a transverse centerline of the bar, and a second-bar portion corresponding to the second-slot portion, wherein a width of a lateral side of the bar increases with increasing distance from the transverse centerline of the bar.

16. The structure of claim 15 wherein the bar of shape memory alloy is in a deformed state.

17. The structure of claim 15 wherein the bar of shape-memory alloy is in a recovered state.

18. The structure of claim 15 wherein the bar of shape-memory alloy is made of a copper-base alloy.

19. The structure of claim 15 wherein the first slot and the second slot are dovetail slots, and wherein the bar of shape-memory alloy has V-shaped grooves on its opposing lateral sides.

20. The structure of claim 15, wherein the heat sink is a radiator.

21. The structure of claim 15, wherein the electronic device is a traveling wave tube.

* * * * *